Figure 1:
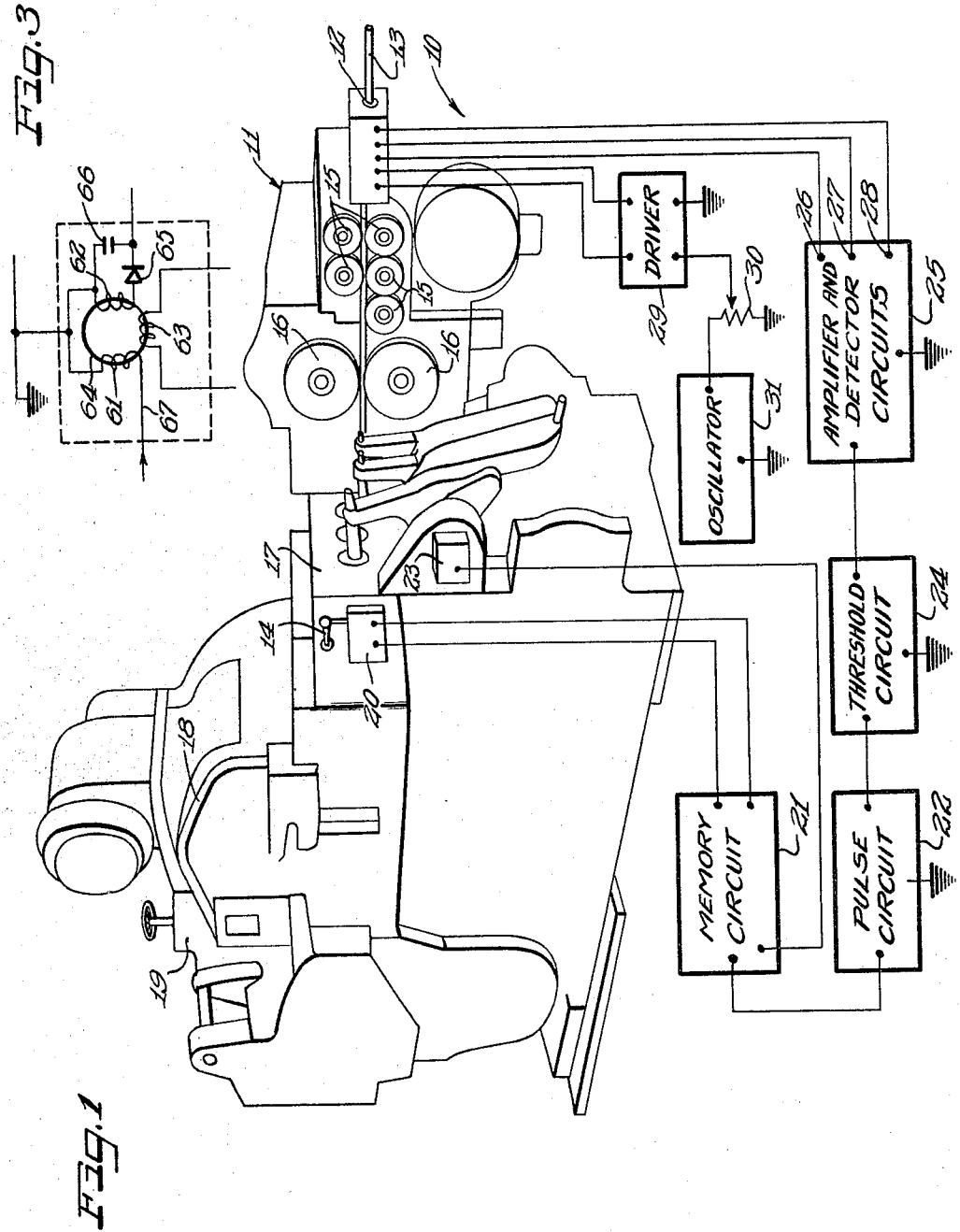

Aug. 2, 1966    J. J. FLAHERTY ET AL    3,263,810
MATERIAL HANDLING CONTROL SYSTEM
Filed April 26, 1963    2 Sheets-Sheet 1

INVENTOR.
John J. Flaherty
John M. Mountz
ATTORNEYS

INVENTOR.
John J. Flaherty
John M. Mountz

ATTORNEYS

United States Patent Office 3,263,810
Patented August 2, 1966

3,263,810
MATERIAL HANDLING CONTROL SYSTEM
John J. Flaherty, Elk Grove Village, and John M. Mountz, Niles, Ill., assignors, by mesne assignments, to Magnaflux Corporation, Chicago, Ill., a corporation of Delaware
Filed Apr. 26, 1963, Ser. No. 275,920
2 Claims. (Cl. 209—74)

This invention relates to a system for inspection of materials and more particularly to a system wherein only defective material may be rejected to obtain a substantial savings in satisfactory material and which permits the inspection of materials while processing thereof and the ejection or marking of defective material without interruption of the processing operation. The system is comparatively simple in construction and operation while being highly reliable and is also very versatile being readily applied to various material processing and testing operations such as, for example, bolt making, electric weld inspection and tube, wire and pipe testing using eddy current, leakage field, magnetic particle, ultrasonic, or other testing methods.

The invention was evolved with the general object of improving efficiency and minimizing the wastage of material in the inspection of materials by non-destructive methods. In prior art applications of such methods, it has often been necessary to discard large amounts of satisfactory material in order to insure the elimination of defective material, and this has been a particularly serious problem when the material is expensive. In applications wherein the material is being processed while being inspected, it has often been necessary to interrupt the processing operation in order to insure rejection of defective material.

In the testing of pipe by eddy current methods, for example, it has been necessary to provide drive and guide rollers adjacent a test coil assembly and it has not been possible to provide marking means close to the test coil assembly. As a result, it has not been possible to accurately locate a defect in the pipe and it has been necessary to discard large portions of the pipe to insure elimination of the portion having a defect therein. In bolt making machines, as another example, the detection of a defect in rod stock entering the machine has necessitated the interruption of the operation of the machine to eliminate the defective material.

According to this invention, an electrical pulse is developed in response to a flaw or other defect in moving material which may either be a continuous length of material or in the form of a series of parts, with the motion being either continuous or in steps. The electrical pulse so developed is applied to the first of a chain of shift units each of which is adapted to store an input pulse and to transfer the stored pulse to a subsequent unit in response to application of a shift signal thereto. An output pulse from the final unit of the chain is used to perform an operation on the material under test, as by applying a mark to the material or rejecting a part, the operation being performed at a point spaced from the testing point. To accurately correlate the marking or rejection operation with the defective material, shift signals are applied to all of the shift units at a rate determined by the rate of movement of the material, the distance between the testing and operating points, and the number of shift units in the chain.

This arrangement is highly accurate and reliable and minimizes waste of material by closely defining the defective part or portion thereof. It is particularly advantageous when combined with a material processing system wherein defective parts or portions of the material can be marked or rejected only at a distance from the testing point, since it permits uninterrupted operation of the processing system.

In addition, the arrangement is very versatile since the number of shift units and the rate of application of shift signals can be selected according to the nature of the processing and testing system, and any desired degree of accuracy can be obtained.

Important features of the invention reside in the means used to develop the shift signals either from an adjustable frequency source or from a pulse generator operated from the processing system to accurately synchronize operation, and in the construction, interconnection and control of the shift units in a manner to obtain a high degree of versatility while obtaining efficient and reliable operation.

Figure 2:
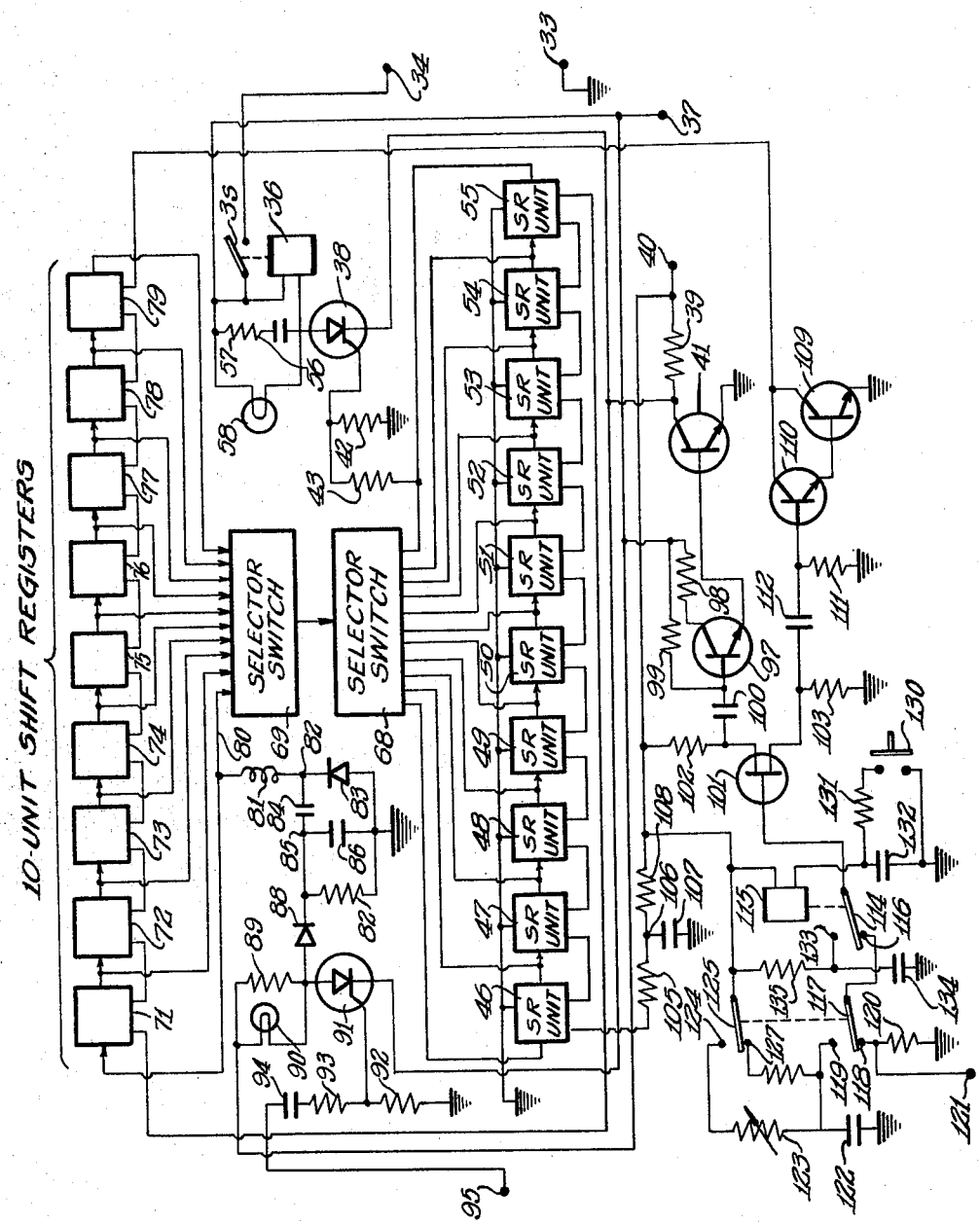

The invention contemplates other objects, features and advantages which will become more fully apparent from the following detailed description taken in conjunction with the accompanying drawings which illustrate a preferred embodiment and in which:

FIGURE 1 diagrammatically illustrates a control system constructed according to the invention and applied to a bolt making machine;

FIGURE 2 is a circuit diagram of a memory circuit of the control system of FIGURE 1; and FIGURE 3 is a circuit diagram of a shift register unit used in the memory circuit of FIGURE 2.

Reference numeral 10 generally designates a control system constructed according to this invention, applied to a bolt making machine 11. The system 10 comprises a test coil unit 12 which tests rod stock 13 as it enters the machine 11 and in response to predetermined signals from the unit 12, the system later automatically operates an ejector lever 14 to eject only those parts which do not meet predetermined inspection standards.

The operation of the testing and control system 10 is such that it permits continuous uninterrupted operation of the bolt making machine 11 and it can be readily adjusted to accommodate the making of bolts of various sizes. In addition, it is highly reliable in operation and also very versatile, being applicable to other types of material processing and testing operations, as noted above. It can be used to mark defective parts or portions of parts, as well as in the ejection thereof.

The bolt making machine 11 is of a known construction and it therefore is not illustrated in detail. In general, the rod 13 is guided and fed by means of a series of small rollers 15 and a pair of larger rollers 16 into a portion 17 of the machine wherein a series of operations are performed, the stock being first cut to the required length, after which a series of shaping operations are performed to form a hexagonal or square head of the bolt. The parts so formed in the portion 17 are fed through a tube 18 to a thread-cutting portion 19 of the machine.

The ejector lever 14 may be operated either manually or automatically to eject a part from the portion 17 without interference with the continuous operation of the machine. The automatic ejection is performed by a solenoid unit 20 connected to the output of a memory circuit 21 which receives and stores pulses from a pulse circuit 22, indicative of defective parts. The memory circuit 21 may also respond to pulses from an impulse-generating unit 23 operative to generate pulses at a rate proportional to the rate of operation of the bolt making machine 11.

The pulse circuit 22 responds to the output of a threshold circuit 24 responsive to the output of an amplifier and detector circuit 25 having input terminals 26–28 connected to the test coil unit. The test coil unit 12 may preferably be an eddy current unit having a primary winding and a pair of differentially connected secondary windings surrounding longitudinally spaced portions of the rod 13, such secondary windings being connected to the terminals 26–28. The primary winding is connected to the output of a driver 29 having an input connected to a potentiometer 30 connected to the output of an oscillator 31.

In operation, signals developed by the differentially connected secondary windings are balanced when the physical characteristics of the portions of the rod 13 and the unit 12 are uniform. However, a change in the physical characteristic of the rod, such as produced by a flaw therein, produces a signal which is applied to the amplifier and detector circuit 25 and when the signal exceeds a certain magnitude, a signal is developed at the output of the threshold circuit to cause the pulse circuit 22 to apply a pulse to the memory circuit 21.

The memory circuit 21 stores any such pulses and subsequently operates at the proper times to energize the solenoid actuator 20 and eject defective parts.

Referring now to FIGURE 2, the memory circuit 21 has a pair of output terminals 33 and 34 for connection to the solenoid actuator unit 20, terminal 33 being grounded and terminal 34 being connected through a contact 35 of a relay 36 to a power supply terminal 37. The relay 36 has one terminal connected to the power supply terminal 37 and a second terminal connected to the anode of a silicon controlled rectifier 38 having a cathode connected through a resistor 39 to a power supply terminal 40 and also to the collector of a transistor 41 the emitter of which is grounded. The gate electrode of the silicon controlled rectifier 38 is connected through a resistor 42 to ground and through a resistor 43 to the output of a chain of ten shift register units 46–55.

In operation, the transistor 41 is normally conductive and a positive pulse from the last shift register unit 55 triggers the silicon controlled rectifier 38 into conduction to energize the relay 36 to close the relay contact 35 and to thereby apply a signal to the actuator unit 20. Thereafter, and before another output pulse can be applied from the last shift register unit 55, a clock or timing pulse is applied to the transistor 41, in a manner to be described, to render it non-conductive and to cut off conduction through the silicon controlled rectifier 38, the cathode of the silicon controlled rectifier 38 being connected through the resistor 39 to the power supply terminal 40 having a positive potential higher than that of the terminal 37.

A capacitor 56 is connected in parallel with the relay 36 through a resistor 57 to receive the energy stored in the relay 36, while a lamp 58 is connected in parallel with the relay 36 to indicate when it is energized.

Each of the shift register units 46–55 has a circuit as illustrated in FIGURE 3. In particular, an input winding 61, an output winding 62 and a shift winding 63 are provided on a magnetic ring 64, with the output winding 62 being connected to the input of the succeeding unit through a circuit including a series diode 65 and a shunt capacitor 66. In operation, a positive pulse applied to an input line 67 magnetizes the ring 64 in one direction. Thereafter, and before another pulse can be applied to the input line 67, a pulse is applied to the shift coil 63 to cause the ring 64 to be magnetized in the opposite direction, to develop a pulse in the output winding 62 of such polarity as to charge the capacitor 66 through the diode 65. When the shift pulse is removed, the capacitor 66 discharges through the input winding of the succeeding unit to apply a positive pulse thereto. If another positive pulse is applied to the input line 67, another pulse will be developed at the output, following the next shift pulse. If, however, no input pulse is applied, the ring will not be magnetized and no output will be developed in response to the next shift pulse. Accordingly, information is stored and shifted along the chain of shift register units in response to shift pulses to develop an output from the final unit after a delay determined by the rate of application of the shift pulses and the number of units in the chain.

Input pulses are applied to a selected one of the shift register units 46–55 through a selector switch 68 connected through a second selector switch 69 to the output of one of nine shift registers 71–79 or to a line 80 connected to the input of the first register 71. Each of the registers 71–79 contains ten serially connected shift register units of the type illustrated in FIGURE 3. With this arrangement, any number of shift register units are connected in series, from 1 through 100.

Line 80 is connected through an inductor 81 to a circuit point 82 connected to ground through a diode 83 and through a capacitor 84 to a circuit point 85 which is connected to ground through the parallel combination of a capacitor 86 and a resistor 87. Circuit point 85 is connected through a diode 88 and through the parallel combination of a resistor 89 and a signal lamp 90 to the power supply terminal 37, and also to the anode of a silicon controlled rectifier 91 having a cathode connected through the resistor 39 to the power supply terminal 40 and through the transistor 41 to ground. The gate electrode of the silicon controlled rectifier 91 is connected through a resistor 92 to ground and through a resistor 93 and a capacitor 94 in series to an input terminal 95.

In operation, the transistor 41 is normally conductive and a positive input pulse triggers the silicon controlled rectifier 91 into conduction thereby dropping the potential of the anode thereof to a relatively low value. When a shift pulse is applied to render the transistor 41 non-conductive, the potential of the anode of the silicon controlled rectifier 91 rises to a value approaching that of the power supply terminal 37 and a positive signal is developed at the circuit point 85. After a certain delay as determined by the values of the capacitor 84 and the inductor 81, a positive pulse is developed at the line 80. The diode 83 prevents any substantial negative swing of the potential of the circuit point 82 and oscillations of the circuit including capacitor 84 and inductor 81. Accordingly, the circuit including the silicon controlled rectifier 91 operates as a first shift register stage.

To control conduction of the transistor 41, the base thereof is connected to the emitter of a transistor 97 having a collector connected through a resistor 98 to the power supply terminal 37 and having a base connected through a resistor 99 to the power supply terminal 37 and through a capacitor 100 to a "base 2" electrode of a unijunction transistor 101, the "base 2" electrode being connected through a resistor 102 to the power supply terminal 40. The "base 1" electrode of the unijunction transistor 101 is connected through a resistor 103 to ground. In operation, the transistor 97 is normally maintained conductive by the connection of the base thereof through the resistor 99 to the positive power supply terminal 37 and the transistor 41 is thereby maintained conductive. The unijunction transistor 101 periodically conducts to develop a positive signal at the "base 1" electrode and a negative signal at the "base 2" electrode. The negative signal at the "base 2" electrode is applied through the capacitor 100 to cut off conduction of the transistor 97 and to thereby cut off conduction of the transistor 41, to thereby cut off conduction through the silicon controlled rectifiers 38 and 91.

To apply shift pulses to the coils of the magnetic shift register units, the shift coils thereof are all connected in series with one end of the series circuit being connected through a resistor 105 to a circuit point 106 connected through a capacitor 107 to ground and through a resistor 108 to the power supply terminal 40. The other end of the series shift coil circuit is connected to the collectors of a pair of transistors 109 and 110 with the emitter of the transistor 110 being connected to the base of the transistor 109 and with the emitter of the transistor 109 being grounded. The base of the transistor 110 is connected through a resistor 111 to ground and through a capacitor 112 to the "base 1" electrode of the unijunction transistor 101. In operation, when the unijunction transistor 101 conducts, a positive signal developed at the "base 1" electrode is applied through the capacitor 112 to cause conduction of the transistors 109 and 110 and to thereby apply shift pulses to all of the shift coils of the shift registers.

To control operation of the unijunction transistor 101, the emitter thereof is connected to a contact 114 of a relay 115 which is normally deenergized with the contact 114 being engaged with a contact 116. Contact 116 is connected to a selector switch contact 117 which is engageable with either a contact 118 or a contact 119. Contact 118 is connected through a resistor 120 to ground and to an input terminal 121 which in the system of FIGURE 1 is connected to the output of the pulse generator 23 to receive pulses at a rate proportional to the rate of operation of the bolt making machine 11. Such pulses, of positive polarity, trigger the unijunction transistor 101 to apply shift pulses to the shift unit of the circuit.

In the alternative, selector switch contact 117 may be engaged with the contact 119 to operate the unijunction transistor 101 at a constant frequency which may be adjusted as desired. In particular, contact 119 is connected through a capacitor 122 to ground and through a variable resistor 123 to a fixed switch contact 124 engageable by a movable contact 125 which is ganged to the contact 117. Contact 125 is connected to the power supply terminal 40. In operation, the capacitor 122 is charged through the resistor 123 until the potential of the emitter of the unijunction transistor 101 reaches the firing point thereof, whereupon the transistor conducts and the capacitor 122 is discharged, after which the capacitor 122 again charges up through the resistor 123 to initiate another cycle. The rate of operation is, of course, adjustable by adjustment of the resistor 123. The capacitor 122 is maintained in a charged state, when the selector switch is in the illustrated position, through a resistor 126 connected to a contact 127 engaged by the contact 125.

A reset switch 130 is provided for rapidly placing all of the shift units in a "zero" state. This switch connects the relay coil 115 between the power supply terminal 40 and ground, through a series resistor 131, a capacitor 132 being connected between one terminal of the relay 115 and ground. When the relay 115 is energized, the contact 114 engages a contact 133 connected through a capacitor 134 to ground and through a resistor 135 to the power supply terminal 40. The capacitor 134 and resistor 135 operate in the same manner as the capacitor 122 and resistor 123, except in having a very short time constant, so as to cause operation of the unijunction transistor 101 at a high frequency, and to thereby restore all of the shift units to a "zero" state in a very short time.

It will be appreciated that the system 10 can be readily adjusted according to the requirements of a particular testing operation. For example, if the bolt making machine 11 is shifted from making six inch bolts to making three inch bolts, the number of shift register units used can be increased in proportion, to properly time the ejection operation.

As another example, the system can be used in connection with pipe testing apparatus wherein pipe is moved at a certain constant rate of speed through spaced testing and marking points, and using twenty-five shifts units for example, the resistor 123 might be adjusted to obtain a shift frequency such as to properly correlate the testing and marking operations. If a higher or lower degree of resolution were desired, the number of shift units and the frequency might be adjusted in proportion.

It will be understood that modifications and variations may be effected without departing from the spirit and scope of the novel concepts of this invention.

We claim as our invention:

1. In a system for inspection of materials including testing means at a first position for measuring the physical characteristics of the material, means for moving the material to a second position spaced from said first position,
   means connected to said testing means for developing an output pulse in response to physical characteristics of the material outside predetermined standards,
   a chain of shift units connected in cascade and each adapted to store an input pulse and transfer the stored pulse to a subsequent shift unit in response to application of a shift signal thereto,
   means for applying said output pulse to a first shift unit of said chain,
   control rectifier means responsive to a pulse from the output of said chain for providing a control pulse,
   timing means for applying shift signals to said shift units at a certain rate correlated to the rate of movement of said material and the number of shift units in said chain, means responsive to said control pulse for ejecting the material outside said predetermined standards at said second position.

2. In a system for inspection of materials including testing means at a first position for measuring the physical characteristics of the material, means for moving the material to a second position spaced from said first position,
   means connected to said testing means for developing an output pulse in response to physical characteristics of the material outside predetermined standards,
   a chain of shift units connected in cascade and each adapted to store an input pulse and transfer the stored pulse to a subsequent shift unit in response to application of a shift signal thereto,
   a unijunction transistor disposed for applying said shift signal to said chain,
   a first silicon controlled rectifier responsive to said output pulse to allow current conduction therethrough,
   a second silicon controlled rectifier responsive to a pulse from the output of said chain to allow current conduction therethrough,
   means responsive to an output pulse of said unijunction transistor for eliminating current conduction through said first and said second silicon controlled rectifiers,
   a diode rectifier connected between an output of said first silicon controlled rectifier and an input of said chain,
   timing means for applying shift signals to said unijunction transistor at a certain rate correlated to the rate of movement of said material and the number of shift units in said chain, means responsive to an output of said second silicon controlled rectifier for ejecting the material outside said predetermined standards at said second position.

References Cited by the Examiner

UNITED STATES PATENTS 2,990,965 7/1961 Smoll.
3,070,227 12/1962 Larew.
3,141,540 7/1964 Burkhardt _____ 209—74 X ROBERT B. REEVES, *Primary Examiner.*